(12) United States Patent
Weber et al.

(10) Patent No.: US 8,285,727 B2
(45) Date of Patent: Oct. 9, 2012

(54) SIMPLIFIED SEARCHING FOR MEDIA SERVICES USING A CONTROL DEVICE

(75) Inventors: Barry Jay Weber, Carmel, IN (US); Jennifer Lynn Kolar, Seattle, WA (US); Rajeev Madhukar Sahasrabudhe, Fishers, IN (US)

(73) Assignee: Thomson Licensing S.A., Boulogne (FR)

( * ) Notice: Subject to any disclaimer, the term of this patent is extended or adjusted under 35 U.S.C. 154(b) by 1454 days.

(21) Appl. No.: 10/383,356

(22) Filed: Mar. 6, 2003

(65) Prior Publication Data
US 2004/0177063 A1 Sep. 9, 2004

(51) Int. Cl.
*G06F 17/30* (2006.01)
(52) U.S. Cl. .......................................... 707/749; 725/53
(58) Field of Classification Search ................ 707/1–10, 707/101, 102, 103, 104; 709/223, 231, 295
See application file for complete search history.

(56) References Cited

U.S. PATENT DOCUMENTS

| | | | |
|---|---|---|---|
| 6,374,260 B1 * | 4/2002 | Hoffert et al. | 707/104.1 |
| 6,519,648 B1 * | 2/2003 | Eyal | 709/231 |
| 6,735,628 B2 * | 5/2004 | Eyal | 709/223 |
| 6,792,615 B1 * | 9/2004 | Rowe et al. | 725/37 |
| 7,301,581 B2 | 11/2007 | Katoh | |
| 7,788,696 B2 * | 8/2010 | Burges et al. | 725/114 |

FOREIGN PATENT DOCUMENTS

| | | |
|---|---|---|
| JP | 2000-253367 A | 9/2000 |
| JP | 2002-94890 A | 3/2002 |
| KR | 20020035134 | 5/2002 |
| WO | WO 01/75649 A2 | 10/2001 |
| WO | WO 02/42925 A1 | 5/2002 |
| WO | WO0242925 | 5/2002 |

OTHER PUBLICATIONS

Madria, S. K. et al; "Association Rules for Web Data Mining in WHOWEDA" Proc. 2000 Kyoto Int Conf on Digital Libraries: Research and Practice, Nov. 13, 2000-Nov. 16, 2000 pp. 227-233, XP002461702.

Kovalev, V. et al.: "Color Co-Occurrence Descriptors for Querying-by Example" Proc. 1998. Multimedia Modelling. MMM 98, Oct. 12, 1998, Oct. 15, 1998 pp. 32-38, XP002461701 Lausanne, Switzerland.

Yoon, Mi Hi et al.: "Hybrid video information system supporting content-based retrieval, simularity retrieval and query reformulation" Proc. 1999 IEEE Int. Fuzzy Systems conf. vol. 2, Aug. 22, 1999, Aug. 25, 1999 pp. 1159-1164, XP002461700.

* cited by examiner

*Primary Examiner* — Christyann Pulliam
*Assistant Examiner* — Mellissa M Chojnacki
(74) *Attorney, Agent, or Firm* — Robert D. Shedd; Vincent E. Duffy; Joel M. Fogelson (57) ABSTRACT

A method and apparatus are disclosed for searching for a media content related to a selected media service. A selected media service, as selected by a user operable indicator, has related metadata that is used as the basis of a search query. Once the search query is formulated, the query is submitted to a search engine that returns search results of media content related to the selected media service. Media content then may be selected from the returned search results for rendering in a rendering environment.

4 Claims, 7 Drawing Sheets

```
2231 RESULTS FOUND BY SINGINGFISH DISPLAYING 1-10
PREV  1  2  3  4  5  6  7  8  9  10  NEXT
```

1. DAVE MATTHEWS BAND COMMERCIAL - I DID IT, DAVE MATTHEWS BAND  CLICK2MUSIC.CA, 35 SEC — 300K

2. DAVE MATTHEWS BAND COMMERCIAL - I DID IT, DAVE MATTHEWS BAND  CLICK2MUSIC.CA, 35 SEC — 300K 3. 103.7 THE MOUNTAIN DAVE MATTHEWS BAND - EVERYDAY, 103.7 THE MOUNTAIN DAVE MATTHEWS BAND - EVERYDAY  WWW.KMTT.COM, 39 SEC — 28.8K

4. BRUISED FAITH, BLANKET  COMMONERARECORDS.COM, 2 MIN 47 SEC — 28.8K

5. BRUISED FAITH, BLANKET  WWW.COMMONERARECORDS.COM, 10 MIN 35 SEC — 28.8K

6. WALK AWAY, BAD SHADOW  WWW.COMMONERARECORDS.COM, 4 MIN 12 SEC — 28.8K

7. BRUISED FAITH, BLANKET  WWW.COMMONERARECORDS.COM, 2 MIN 47 SEC — 28.8K

8. WETN WHEATON COLLEGE RADIO, WHEATON COLLEGE  WWW.WHEATON.EDU, © 2002 — 28.8K

9. PINEFOREST CRUNCH; INDIESMUSIC.COM - COLLEGE RADIO LISTENERS;  INDIESMUSIC.COM (TRACK: 35092, ITEM: 5255), PINEFOREST CRUNCH;  INDIESMUSIC.COM  INDIESMUSIC.COM, © DODGIEDISC ; 2001 IQI CO., LTD., 30 SEC — 56K 10. 50 YEARS OF WHEATON COLLEGE RADIO, WHEATON COLLEGE  WWW.WHEATON.EDU, 11 MIN 20 SEC — 28.8K

SIMPLIFIED SEARCHING FOR MEDIA SERVICES USING A CONTROL DEVICE

FIELD OF THE INVENTION

The present invention relates generally to computer related information search and retrieval, and more specifically to use of a control device for enabling the search for a media services available through a communications network.

BACKGROUND OF THE INVENTION

Communications networks, such as the Internet, have made a variety of media services such as multimedia files or streaming programming available to the average user. A user searching for a type of programming however may have difficulty in locating a media service buried among the millions of programming services and files available through the Internet. The volume and variety of media services available is likely to continue to increase as more users and content providers move from narrowband to broadband connections. This growth, combined with the highly decentralized nature of the Internet, creates substantial difficulty in locating a particular media service.

A user may use a program known as a search engine to locate media services available through a communications network. A search engine comprises a set of programs that are accessible at a network site within a communications network, for example, a local area network (LAN) or the Internet with World Wide Web sites. One program, called a "robot" or "spider", pre-traverses a network in search of media services (located at web pages, FTP sites, and the like) and builds large index files of keywords found in sources of metadata related to such media services. Typically, a user formulates a query comprising one or more search terms and submits the query to another program of the search engine. In response, the search engine inspects its own index files and displays a list of media services that match the search query, typically as hyperlinks to the media services. The user then activates a hyperlink to retrieve a listed media service.

Search engines, however, have drawbacks. For example, many search engines require a user to input a text query for searching for available resources. This type of text query is typically entered into a search engine via a keyboard or other type of input device accommodating complex input commands from a user. This situation may be less then desirable when a user is operating in a setting without easy access to a computer keyboard, such as when using a home-based media center typically centered around a display device as a television set. The user may not have anything more than a remote control (with a limited means of input) to select between media service choices. The user therefore may not directly utilize the resources of a search engine, unless the control device accommodates a complex set of input functions.

Therefore, a need exists for a system and method, which permits a user to search for a media service available through a communication network via control device for use in a media center environment, without requiring the input of text for a search query.

SUMMARY OF THE INVENTION

A method and apparatus are disclosed for searching for media content related to a selected media service. A selected media service, chosen via a user operable indicator, has metadata related to the selected media service. This metadata is formatted automatically into a search query. The search query is submitted to a search engine that returns search results related to the selected media service. The search is initiated by enabling a search function via a user control device, without requiring textual input.

BRIEF DESCRIPTION OF THE DRAWINGS

The invention is best understood from the following detailed description when read in connection with the accompanying drawing. The various features of the drawings may not be to scale. Included in the drawing are the following figures.

DETAILED DESCRIPTION OF THE INVENTION

The present invention is a method and a system for retrieving media services, content, and data related to media services, as available through a communications network. As detailed below, a search system is described for a media center utilizing metadata related to a selected media service. As used herein, the term "media services" and "media content" include audio, video, textual, broadcasted programs, multimedia data files, and streaming media files. Broadcasted programs comprise services that are capable of being rendered via a radio, television set, or other type of rendering media device. Such broadcasted services are typically broadcasted from a television or radio station through the airwaves, and received as data signals via a cable connection, satellite dish, antenna, and any other of connection capable of delivering broadcasts. Programming may also be transmitted through a communications network, as the Internet, for rendering by a computer program known as a media browser or player, such as REALONE® or MICROSOFT MEDIA PLAYER®.

Multimedia files comprise any combination of text, image, video, and audio data. It is to be noted that a file consisting of just video or audio data is also to be defined as a multimedia file. Streaming media comprises audio, video, multimedia, textual, and interactive data files that are delivered to a user's device via the Internet or other communications network environment that may play on the user's computer/device before delivery of the entire file is completed. One advantage of streaming media is that streaming media files begin to play before the entire file is downloaded, saving users the long wait typically associated with downloading the entire file.

Examples of the content of multimedia files and streaming media include songs, political speeches, news broadcasts, movie trailers, live broadcasts, radio broadcasts, financial conference calls, live concerts, web-cam footage, and other special events. Streaming media is encoded in various formats, examples including REALAUDIO®, REALVIDEO®, REALMEDIA®, APPLE QUICKTIME®, MICROSOFT WINDOWS® MEDIA FORMAT, QUICKTIME®, MPEG-2 LAYER III AUDIO, and MP3®. Typically, media files are designated with extensions (suffixes) indicating compatibility with specific formats. For example, media files (e.g., audio and video files) ending in one of the extensions, .ram, .rm, .rpm, are compatible with the REALMEDIA® format. Some examples of file extensions and their compatible formats are listed in the following table. A more exhaustive list of media types, extensions and compatible formats may be found at http://www.bowers.cc/extensions2.htm.

TABLE 1

| Format | Extension |
| --- | --- |
| REALMEDIA ® | .ram, .rm, .rpm |
| APPLE QUICKTIME ® | .mov, .qif |
| MICROSOFT WINDOWS ® MEDIA PLAYER | .wma, .cmr, .avi |
| MACROMEDIA FLASH | .swf, .swl |
| MPEG | .mpg, .mpa, .mp1, .mp2 |
| MPEG-2 LAYER III Audio | .mp3, .m3a, .m3u |

Metadata as descriptive data literally means "data about data." Metadata is data that comprises information that describes the contents or attributes of other data (e.g., media service). For example, a document entitled, "Dublin Core Metadata for Resource Discovery," (http://www.ietf.org/rfc/rfc2413.txt) separates metadata into three groups, which roughly indicate the class or scope of information contained therein. These three groups are: (1) elements related primarily to the content of the resource, (2) elements related primarily to the resource when viewed as intellectual property, and (3) elements related primarily to the instantiation of the resource. Examples of metadata falling into these groups are shown in the following table.

TABLE 2

| Content | Intellectual Property | Instantiation |
| --- | --- | --- |
| Title | Creator | Date |
| Subject | Publisher | Format |
| Description | Contributor | Identifier |
| Type | Rights | Language |
| Source | | |
| Relation | | |
| Coverage | | |

Sources of metadata include web page content, uniform resource indicators (URIs), media files, and transport streams used to transmit media files. Web page content includes HTML, XML, metatags, and any other text on the web page. As explained in more detail, herein, metadata may also be obtained from the URIs, uniform resource locators (URLs) the web page, media services, and other metadata. Metadata within the media service may include information contained in the media file, such as in a header or trailer, of a multimedia or streaming file, for example. Metadata may also be obtained from the media/metadata transport stream, such as TCP/IP (e.g., packets), ATM, frame relay, cellular based transport schemes (e.g., cellular based telephone schemes), MPEG transport, HDTV broadcast, Packet Identifers (PIDs) related to broadcasted programming, and wireless based protocol transport packets, for example. Metadata may also be transmitted in a stream in parallel or as part of the stream used to transmit a media file (a High Definition television broadcast is transmitted on one stream and metadata, in the form of an electronic programming guide, is transmitted on a second stream).

Each media service has a respective set of associated metadata. The metadata is used as the core for allowing a media service to be searchable within the context of a search engine. A web crawler associated with a search engine will go to resources available through a communications network trying to locate media services and metadata. As the web crawler identifies a particular media service, the web crawler uses a component to determine what metadata is associated with the media service. For example, a web crawler identifies a media service located at the URI http://www.trancemusic.com/acid-jazz.mp3, which is associated with an MP3 file called "ACID-JAZZ". The web crawler (as an extraction module) will note and extract metadata related to the media service's location, title, and any additional metadata that may be contained in the data of or related to the media service. In the present case, the MP3 service has an associated tag with metadata and metadata fields identifying the media service's composer, copyright date, and genre of music. The web crawler takes all the metadata, via an extraction module with the associated metadata fields and catalogs the media service into a searchable index that is accessible by a search engine. Different methods may be used to access metadata associated with a media service, as consistent with principles of the present invention.

Rendering a media service represents the playing of a media service. Rendering typically takes the form of displaying a video based media service and producing audio of an audio based media service. The rendering of a media service takes place in a rendering environment. For a video service, the rendering environment would be a window or area of display (partial or full screen of a display device) where the video service is shown. Audio based media services are rendered by use of loudspeaker(s) or other type of device capable of producing audio.

Figure 1:
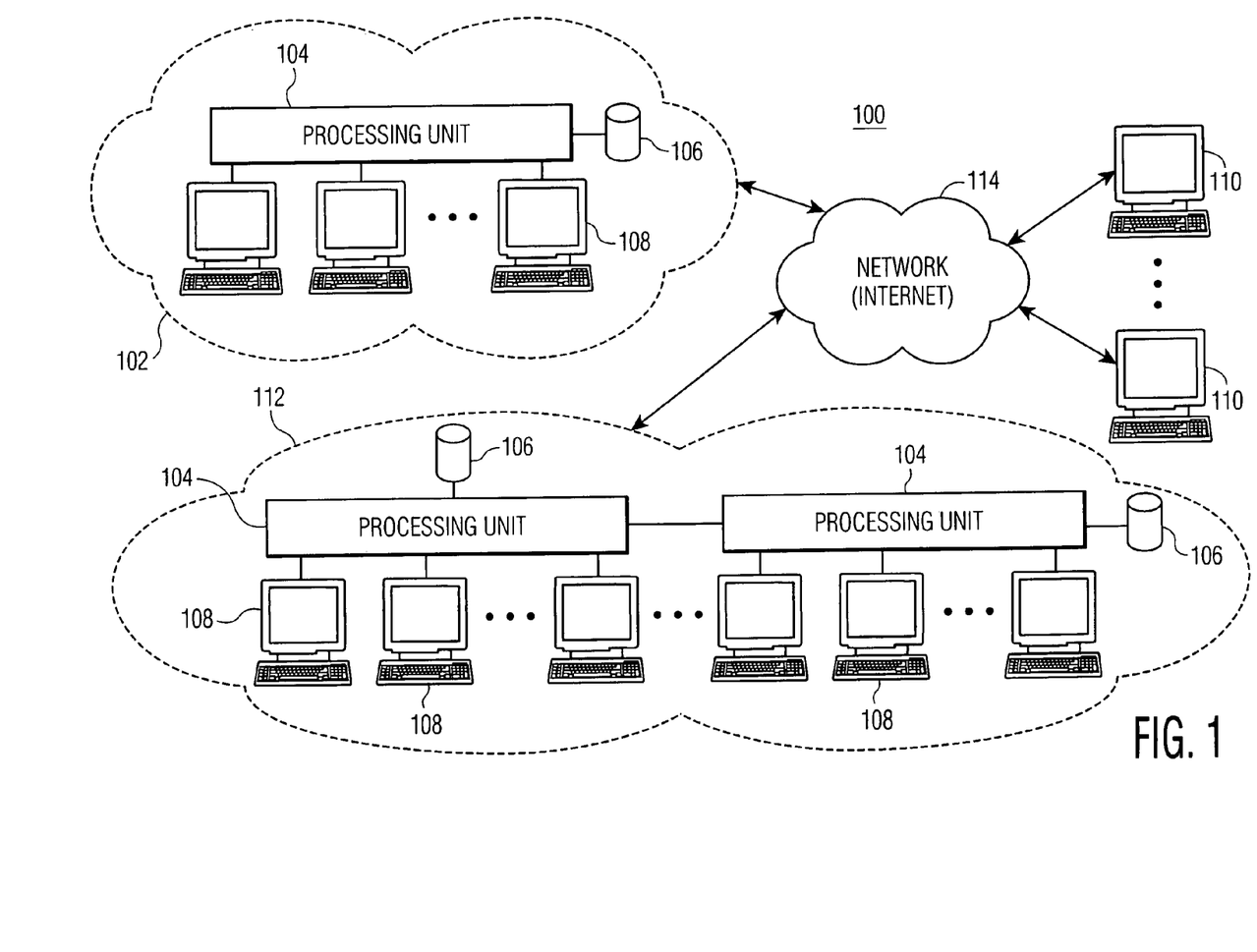
FIG. 1 is an overview illustration of a system of a communication network.

FIG. 1 shows an overview of a system 100 that has media services available through a communications network. Each computer system network 102 and 112 contains at least one corresponding local computer processor unit 104 (e.g., server), which is coupled to at least one corresponding local data storage unit 106 (e.g., database), and local network users 108. A computer system network may be a local area network (LAN) 102 or a wide area network (WAN) 112, for example. The local computer processor units 104 are selectively coupled media centers 110 through the network (e.g., Internet) 114. Each of the plurality of local computer processors 104, the network user processors 108, and/or the media centers 110 may have various devices connected to system, as a computer system, television set, video tape recorder, personal video recorder, digital video disc (DVD), and the like. A local computer processor 104, network user processor 108, and/or media center 110 are programmed with a media browser for locating and selecting (e.g., by clicking with a mouse) a media service that is located in the local data storage unit 106 of a computer system network 102, 112. The media services may contain links to other computer systems, Web pages, and other media content.

Local computer processor 104 and network user processor 108 may be a computer terminal, a pager which can communicate through the Internet using an Internet Protocol (IP) based communication, a Kiosk with Internet access, a connected electronic planner (e.g., a PALM device manufactured by Palm, Inc.) or other device capable of interactive communication through a network, such as an electronic personal planner. The local computer processor 104, the network user processor 108, and/or the media center 110 may also be a wireless device, such as a hand held unit (e.g., cellular telephone), that connects to and communicates through the Internet using the wireless access protocol (WAP). Networks 102 and 112 may be connected to the network 114 by a modem connection, a Local Area Network (LAN), cable modem, digital subscriber line (DSL), twisted pair, wireless based interface (cellular, infrared, radio waves), or equivalent connection utilizing data signals. Databases 106 may be connected to the local computer processor units 104 by any means known in the art. Databases 106 may take the form of any appropriate type of memory (e.g., magnetic, optical, etc.). Databases 106 may be external memory or located within the local computer processor 104, the network user processor 108, and/or the media center 110. Database 106 may have media services and related metadata that can be retrieved by media center 110.

In an exemplary embodiment of the invention, network user processors 108 and/or media center 110 include one or more program modules that allow user processors 108 and/or media center 110 to communicate with local processor 104, and each other, over network 114. The program module(s) include program code, written in PERL, Extensible Markup Language (XML), Java, Hypertext Mark-up Language (HTML), any other equivalent language that allows network user processors 108 to access the program module(s) of the local processors 104 through browser programs stored on network user processors 108, or any combination thereof.

Web sites, web pages, and data stores (FTP, servers, etc.) are locations available through a network, such as the Internet, where media services reside. A web site, and/or data store may comprise a single or several web pages, media services, media content, media files, and the like. A web page is identified by a Uniform Resource Locator (URL), as an example of a URI, comprising the location (address) of the web page on the network. Web sites, web pages, and data stores may be located on local area network 102, wide area network 112, network 114, processing units (e.g., servers) 104, and user processors 108. Media services and related metadata may be stored in any storage device, such as a hard drive, compact disc, and mainframe device, for example. Content may be stored in various formats, which may differ, from web site to web site, from data store to data store, and even within a web page.

Figure 2:
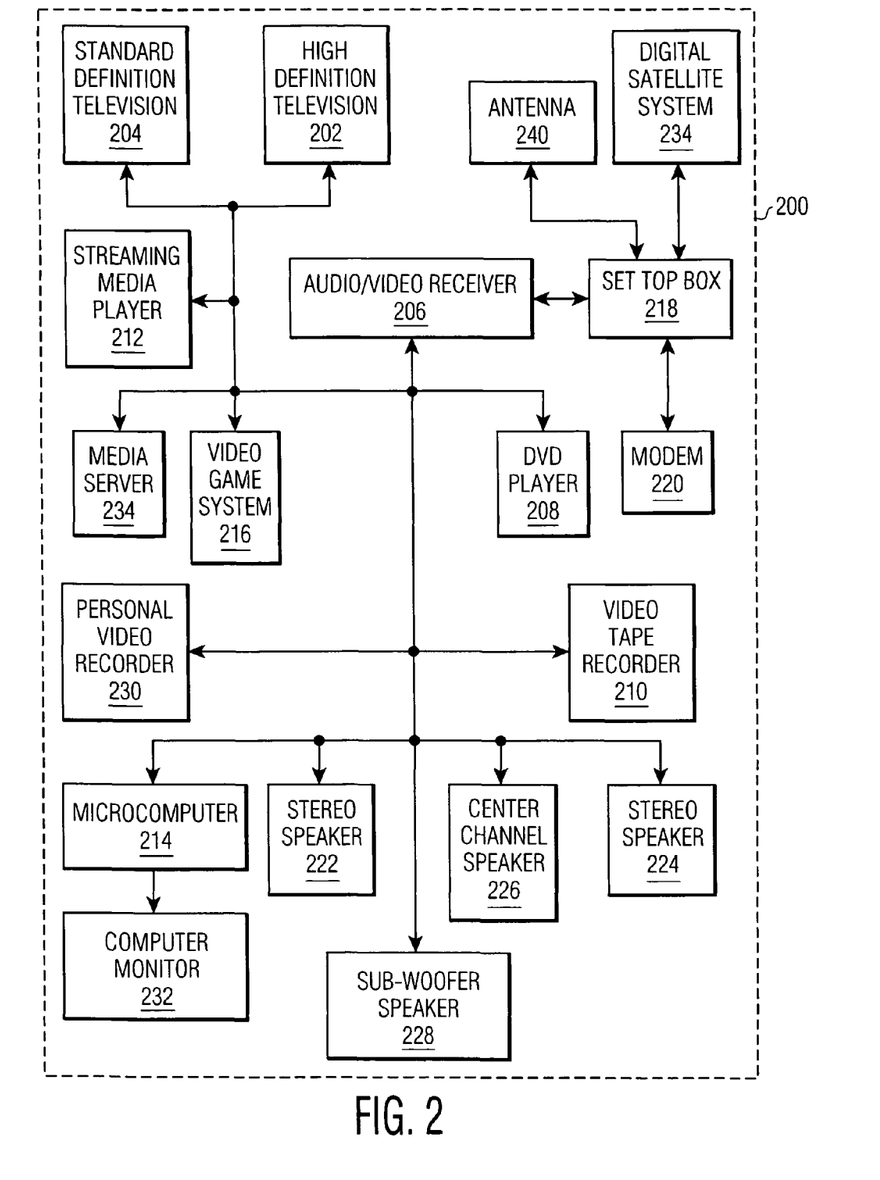
FIG. 2 is a block diagram of an exemplary system of a media center in accordance with an embodiment of the invention.

In FIG. 2, audio and video multimedia devices of media center 200 (media center 110 in FIG. 1), comprising a plurality of connected multimedia devices, is shown as an example of an operating environment for the present invention. The multimedia devices forming entertainment system 200 are preferably connected through a wire-based interface (e.g., RCA cables, Ethernet, coaxial cable, phone lines, IEEE-1394 compliant cables, copper wire, serial cables, optical cable, USB) that provides a bidirectional communications between devices. Optionally, the multimedia devices comprising entertainment system 200 communicate through a wireless interface (e.g., radio frequency, infrared, BLUETOOTH™, 802.11B, 802.11A). Alternatively, the communications are unidirectional utilizing a relationship where one multimedia device is a controller (master) and other multimedia devices (slaves) are coupled to the controller.

The communications between multimedia devices comprises two levels of information: multimedia signals (media services) that are generated and processed in selected audio and video output states available from a plurality of connected multimedia devices, and control information used to manage the connected multimedia devices. The information transmitted is in a digital, analog, and/or a combination thereof data format. For example, multimedia signals generated by DVD player 208 while playing a DVD (media service) are a stereo audio signal outputted for a stereo based selected audio output state and a 2080×1920 pixel 60 Hz interlaced video signal outputted for a HD based selected video output state. The control commands are communications signals that are preferably JAVA™ or XML compliant (that comport to a packet-based structure (TCP/IP), capable of being processed by a data interface/controller residing internal or used for controlling connected multimedia devices. Optionally, the control information is communicated as a parameter (value) of an electric circuit (e.g., voltage, resistance, current, inductance, capacitance) and/or a change in a parameter of an electric signal (e.g., a change in resistance or voltage). As an alternative embodiment, the information transmitted on both levels is in the form of metadata that complies with a proprietary standard (HAVI, MPEG-7, and the like).

Set top box 218 functions as a gateway between media center 200 and media services received from a remote source, as through network 114 (shown in FIG. 1). Media services are capable of being rendered by set top box 218 in selected audio and video output states. A remote source (e.g., satellite, Internet, cable, broadcasting antenna, public switched telephone network (PSTN), cellular network, infrared transmitter), as a service provider, communicates media services as signals that are received by a receiver such as digital satellite system 234, modem 220, and antenna 140. The received media services are distributed through the media center 200 for use by other multimedia devices connected to audio/video receiver 206, and/or coupled to the set top box 218. Optionally, devices as digital satellite system 234 and modem 220 bi-directionally communicate with a remote source for requesting media services (for example, a video on demand from a cable service provider) and for performing maintenance for the entertainment system 200 (e.g., downloading a new audio output state, receiving electronic program guide information, upgrading software drivers and codecs).

Figure 7:
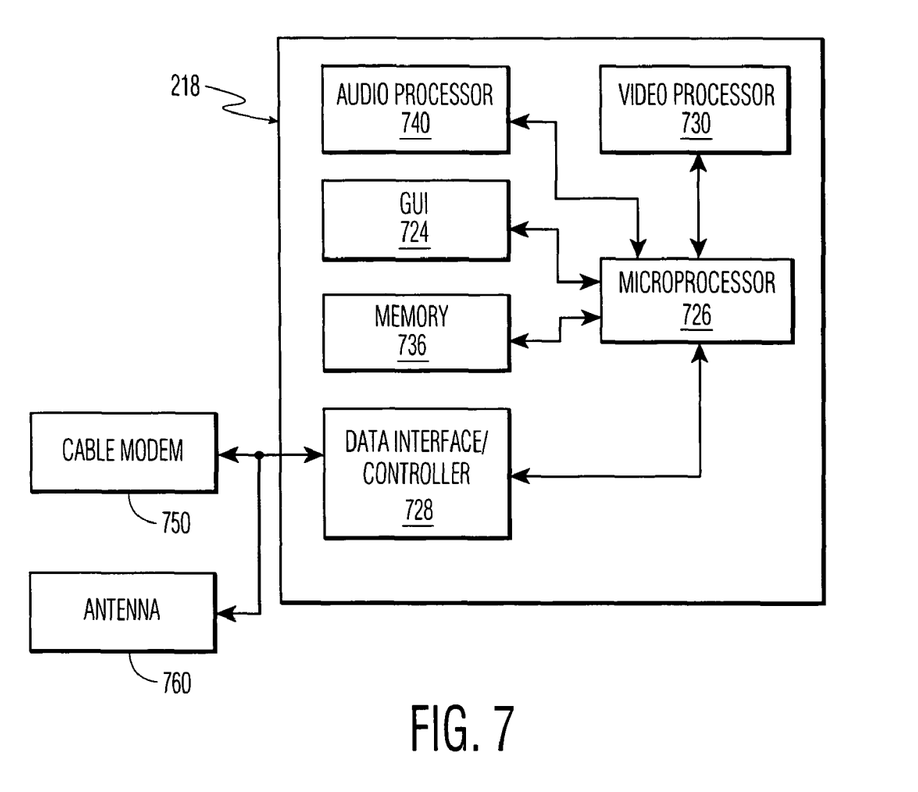
FIG. 7 is an exemplary example of a set top box, in accordance with an embodiment of the invention.

FIG. 7 shows an exemplary embodiment of set top box 218 for controlling media center 200. Video processor 730 and audio processor 740 are used by set top box 218 for rendering a media service. Video processor 730 also displays characters of selections made via a user control device, as a remote control, via an on screen display (OSD) function. Guided User Interface 724 (GUI) is a control system that allows the functions of set top box 218 (related to rendering a media service, sound/graphic options, and the like) to be controlled graphically, as through the use of a user operated indicator (as an arrow, cursor, or the like). Memory 736 stores programming modules, maintenance routines, extracted metadata from media services, search results, and other data necessary to operate media center 200. Microprocessor 726 controls the operation of set top box 218, where microprocessor 726 is coupled to GUI 724, video processor 730, memory 736, and audio processor 740. Data interface/controller 728 couples microprocessor 726 to a communication interfaces as cable modem 750 (for receiving broadband media services) or antenna 760 (for receiving broadcasted programming). Other components or modules may be used with set top box 218, in accordance with the principles of the present invention.

Media center 200 also accommodates and distributes media services available from local sources. DVD player 208, video tape recorder 210, personal and video recorder 230, coupled to the audio/receiver 206, are examples of multimedia devices that provide media services locally (for example, video tape recorder 210 plays a video tape storing a movie) through the use of a removable medium (e.g., video tape, DVD, computer disc, flash memory, compact disc). Other multimedia devices as media server 234 and a streaming media player 212, coupled to the audio/receiver 206, provides locally sourced media services from a local storage device (e.g., hard disc drive, optical disc, flash or static ram). Optionally, media services stored in a local storage device were received and archived from remote sources or from other multimedia devices connected to the media server 234. Other sources of media services are generated locally by software running on microcomputer 214 or video game system 216, which are distributed through a connection to other connected multimedia devices of media center 200.

Media center 200 utilizes multimedia devices for processing and outputting media services in accordance with selected audio and video output states. Audio/video receiver 206 is a multimedia device that matches a source of a media service to multimedia devices that process and output the media service in a selected audio and/or video output state. For example, DVD player 208 distributes an HD video based media service (of a local or remote origin) via the audio/video receiver 206 to high definition television 202. The audio/video receiver 206 preferably selects sources and multimedia devices by control commands. Preferably the audio/video receiver 206 selects for video based media services a standard definition television 204 for displaying media service supporting an SD state, and high definition television 202 for displaying media services supporting an HD state. Optionally, computer monitor 232 displays a locally based media service generated by the microcomputer 214.

Audio-based media services are supported through the audio-based multimedia devices available through media center 200. Preferably, the audio based media services (of local or a remote origin) are outputted by an audio system comprising a group of loudspeakers comprising at least one of stereo speaker 222, stereo speaker 224, center channel speaker 226, and sub-woofer speaker 228. Optionally, standard definition television 204, high definition television 202, or the computer monitor 232 is used to output an audio-based media service via an audio component in the multimedia device (loudspeaker). Audio/video receiver 206 can choose a group of loudspeakers from the audio system in accordance with a selected audio output state, wherein a second group of speakers is chosen when the selected audio output state changes.

Figure 3A:
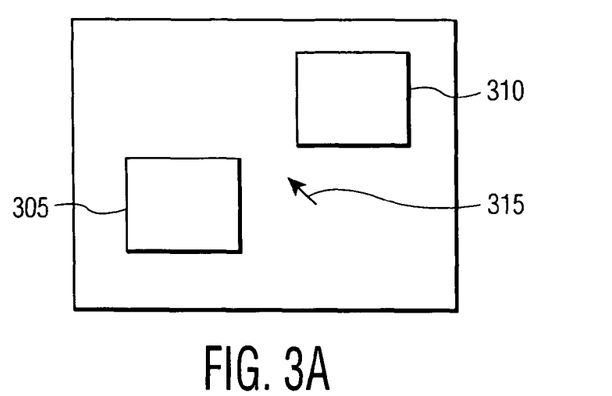
FIG. 3A is a representation of an user interface displaying two rendered media services in accordance with an embodiment of the invention.

FIG. 3A shows an example of media services being rendered on a display device. In the illustrative embodiment of the invention, a display device such as high definition television 202 (from FIG. 2) receives data signals containing media services via set top box 218. The data signals are rendered by high definition television 202 in a rendering environment (window). In the present case, high definition television 202 displays two media services 305, 310 via a picture-in-picture window. Media service 305 is a high definition television broadcast (1080*i* video) of the show "ALIAS", transmitted as a television broadcast. Media service 310 is a streaming media broadcast (320×240 resolution) of a Dave Matthews concert available through the Internet that is rendered via a media browser or player. Set top box 218 may also control the distribution and rendering by devices of other media services. Additionally, a media device may render one or more media services at a time, depending on the number of media services available and the processing power of the device rendering a media service.

Media services are selected via the operation of a user control device, as a remote control or other type of device that accepts user input. A user selects media services by using referral data that identifies a particular media service. The referral data is either entered in by a user or selected (via a list) for choosing a media service. A channel number, on which a media service is being broadcasted on, is one example of referral data that is entered for obtaining a media service. Alternatively, media services are listed in an electronic programming guide, a list of URls, a frequently selected media service list, and the like. Listed media services may be selected via the user control device. The rendering of a selected media service opens a new window (as a rendering environment), or replaces the media service currently being rendered in current rendering environment. Alternatively, a second rendering environment is created for a selected media service when a first media service is currently being rendered in a first rendering environment, although other rendering techniques may be used in accordance with principles of the present invention.

Media service 305 has associated metadata that identifies attributes of the content that may be rendered. Set top box 218 has a metadata extraction module, as software code that identifies metadata and metadata fields associated with a media service, such metadata fields as being actors, title, author, date of original broadcast, future dates of broadcasts of media service 305, and other types of content related attributes. The extraction module operates similar to a web crawler or other type of metadata extraction program. Most of the metadata related to media service 305 was extracted from an EPG listing media service 305. The programming stream that media service 305 is part of, such as data packets or PIDs identifying segments of media service 305, supplies additional metadata. Likewise, media service 310 has metadata and metadata fields that identify the attributes of the media content of the service such as the members of the band, song set list, date of original performance, guest performers, etc. Metadata within the bit stream of media service 310 is extracted by the extraction module. The data extraction module stores this information in a memory cache, as memory 736 (FIG. 7) for further processing.

As an alternative for acquiring metadata, the extraction module makes a request for metadata related to a media service from an outside source. For example, the extraction module may use a metadata resource (such as MUSE, a metadata index available from SINGINGFISH, and the like) to provide metadata related to a media service upon request. In the present case, the extraction module identifies a media service and issues a code. The code is acquired or derived from such techniques as using the physical attributes of a media service (similar to how CDDB identifies a CD based on track length and number of songs), a code contained within the media service (ID code), and/or any other type of technique using identification data. The code is transmitted by the search module to the metadata resource that returns back metadata to the extraction module for gathering.

Indicator 315 is a cursor/icon/arrow that is manipulated by an user control device, such as a remote control, with a means for moving indicator 315, such as a joystick, touchpad, trackball, scrolling dial, arrow keys, or the like. Indicator 315 is used to select between rendered media service 305 and 310, and to provide additional functions related for the operation of media center 200. For example, a user operates indicator 315 to resize the rendering environment displaying media service 310. Addition functions enabled by use of indicator 315 include selecting media services, operating display or sound options, and storing media services.

Indicator 315 is also used for enabling a multimedia search for media content that is related to a selected media service. For example, a user moves indicator 315 on the window (as a rendering environment) displaying media service 310. When indicator 315 is on the window, the border of the rendering environment becomes highlighted, as portrayed in FIG. 3B. Other ways of indicating that a media service has been selected may be used, as shading, hashing, changing the color of a rendered media service, modifying the shape of the rendering environment, or displaying textual information indicating that a media service is currently selected.

Figure 3B:
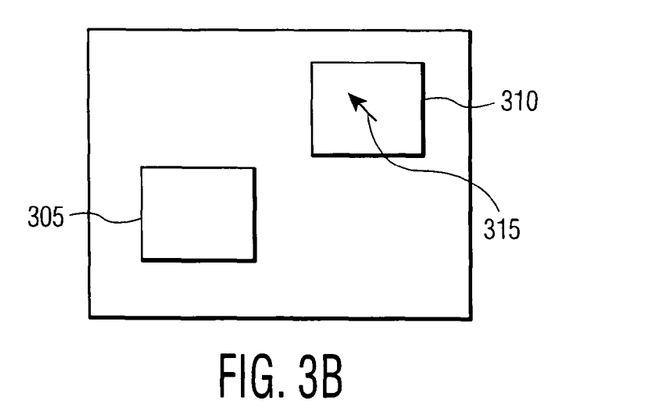
FIG. 3B is a representation of a user interface displaying two rendered media services, one of the media services being selected, in accordance with an embodiment of the invention.
Figure 4:
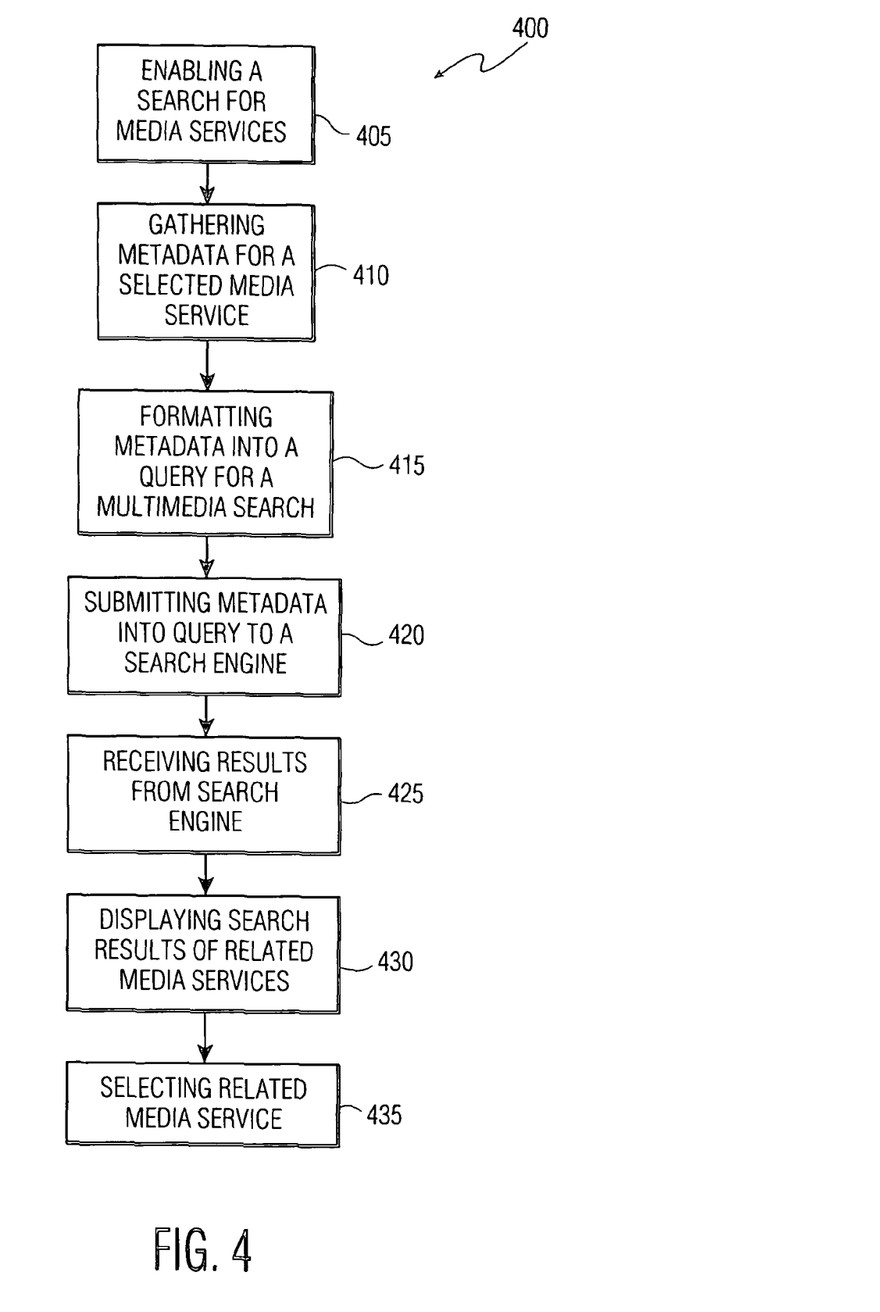
FIG. 4 is a flow diagram of a search for media content related to a selected media service, in accordance with an embodiment of the invention.
Figure 5:
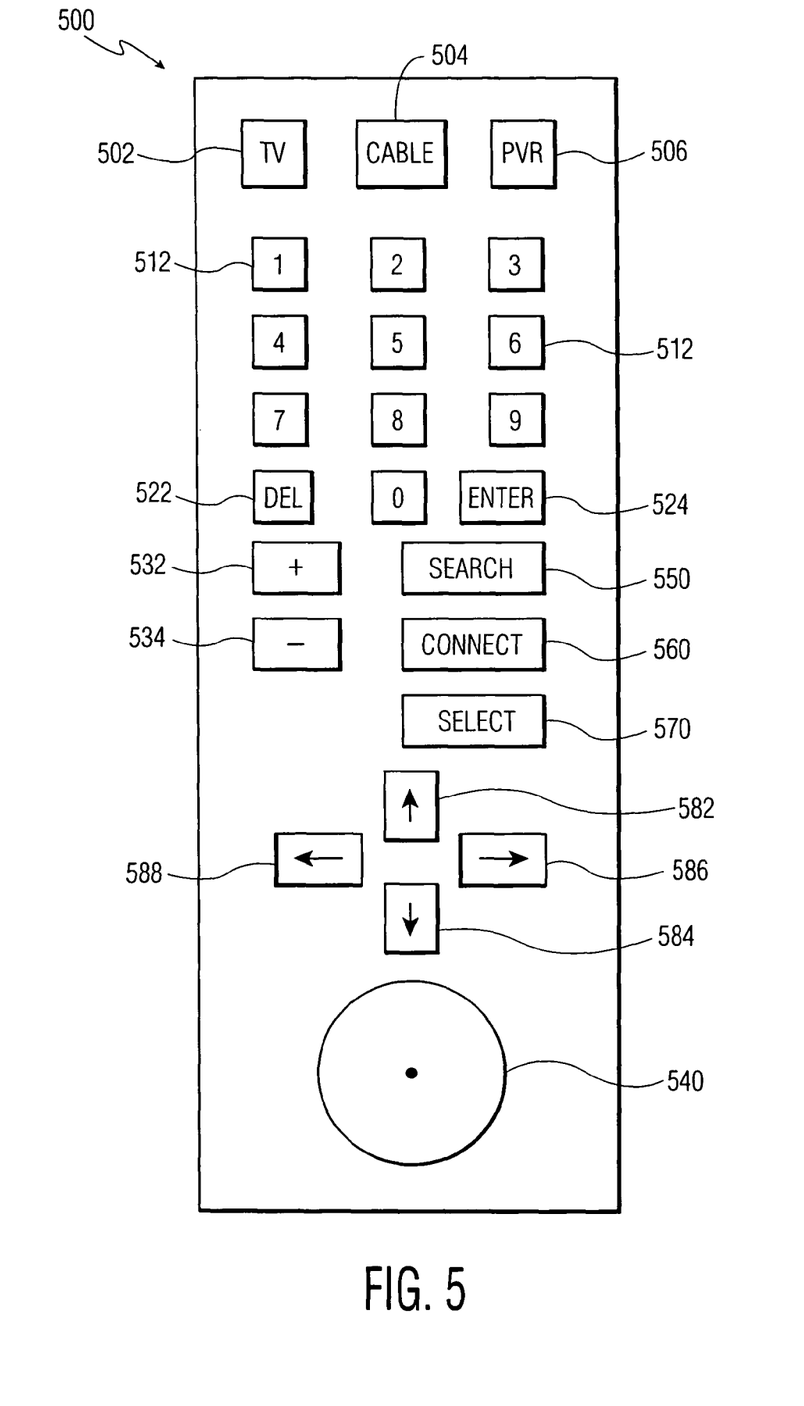
FIG. 5 is a representation of a user control device used for operating a search, in accordance with an embodiment of the invention.

FIG. 4 displays a method for enabling a search for media content via a simplified user interface in accordance with the principles of the present invention. In step 405, a user enables a search for information related to a media service. In the present example, referring to FIG. 3B, a user moves indicator 315 to the window displaying media service 310, which highlights the rendering environment's border. The user then activates a "search button" located on a remote control (as seen in FIG. 5), the remote being an example of a user control device. Upon pressing of the search button (as a user activated switch), the remote control transmits a radio frequency signal to set top box 218 (FIG. 2). Set top box 218, in response to the received signal, enables a search module to begin a search for media content related to media service 310.

In step 410, the search module gathers the metadata that was stored by the metadata extraction module in memory 736, the metadata and metadata fields that are related to media service 310. The search module may optionally rank metadata fields, based on pre-selected search criteria. For example for media services 305,310, metadata fields and their corresponding entries are listed in Table 3.

TABLE 3

| Metadata Field | Metadata Related to Media Service | Metadata Related to Media Service |
| --- | --- | --- |
| Artist | DAVE MATTHEWS BAND | SPICE GIRLS |
| Song List | CRASH, BABYLON | YOU DON'T NEED TALENT TO WIN A GRAMMY |
| Date of Performance | JUN. 25, 2001 | 1997 |
| Performing Guests | DAVID GRAY | ALAN CUMMINGS |
| Title | NO PUNK TOUR | SPICEWORLD |
| Media Service Type | MUSIC VIDEO | MOVIE |
| Genre of Music | COLLEGE RADIO | POPULAR MUSIC |

The gathered metadata is then formatted for a search query by the search module in step 415. The module formats the query by using metadata from commonly used metadata fields, such as Artist and/or Genre of music (as specified in programming of the search module or by user preference), although other metadata fields may be used as available. As an alternative embodiment, a user may specify the fields used to create a search query by ranking metadata fields by order of importance, for example the user may want the Artist and Guest Performer metadata fields (assigned a high rating) to be used over the metadata field of Genre of Music (assigned a low rating). This ranking information is inputted via a user control device and a menu interface, or other type of input means.

The metadata fields used for a search may be further ranked based on the media service type (movie, television show, music, Internet web page, and the like) of media service being offered. For example, a user may specify that for a movie, the Title and Guest performers are the two metadata fields used for supplying metadata to seed a search query. Or, for a music video, Artist and Genre are the metadata fields used to supply metadata for a search query. Using the sample data in TABLE 3, upon the identification of a media service as being a movie (from the media service type metadata field), the title of the movie "SPICEWORLD" and the guest performer "ALAN CUMMINGS" are used as the basis for a search query. In contrast, for a music video, the artist name "DAVE MATTHEWS BAND" and genre of music "COLLEGE RADIO" are used as the basis of the search query for searching for related media content.

As an additional embodiment of formulating a search query, a computer program may be used to determine the frequency of use of specific metadata fields. From this determination, a ranking of frequently used metadata fields would be established. A user would then specify how many terms of metadata should be used for a search query from that ranking list. For example, if it is determined that the top three metadata fields should be used for a search, the search query would use the three most frequently identified metadata fields to use metadata to seed a search query. If a frequently used metadata field is missing from the metadata of a selected media service, the next most frequently used metadata field is used for a search query. Hence, the more terms used for a search query, the more specific the search for related medias services is performed.

In the present example, the search module submits a query search using the metadata from the artist and genre of music video fields "DAVE MATTHEWS BAND" and "COLLEGE RADIO" in step 420. This search query is submitted via the Internet to a search engine, such as SINGINGFISH.COM located at http://www.singingfish.com. The query is submitted as an XML based string that is compatible with the search engine; the query being ("DAVE MATTHEWS BAND" and "COLLEGE RADIO"), although other types of queries may be formulated, depending on user options and available metadata fields.

Figure 6:
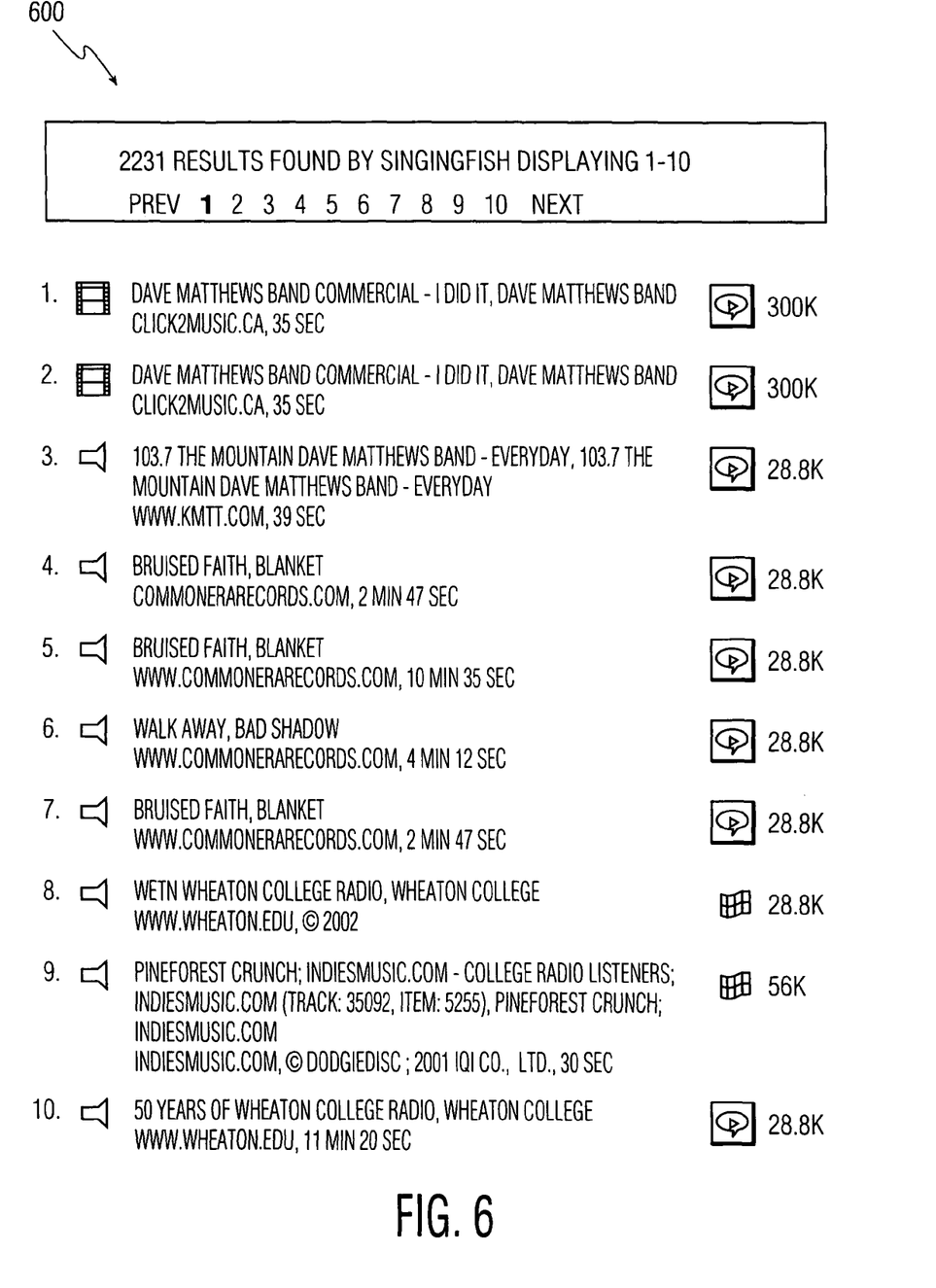
FIG. 6 is a representation of search results returned from a search query, in accordance with an embodiment of the invention.

The search engine returns a list of search resultsin the form of an XML string to the search engine module in step 425. The search engine module formats the received results and displays the results in the form of search results list, as shown in search window 320 of FIG. 3C, in step 430. Search results 600 are shown in FIG. 6, as an example of contents displayed in search window 320. The results contain hyperlinks (URIs) to other resources available through the Internet, specifically other media content that is related to the search query. The information presented may be dependent on the type of media service searched. For example, a media service of a rock concert would list information related to music, while a media service of a movie would present information as actor biographies, award nominations, other related movies, and the like.

Optionally, the search results may be prioritized based upon the type of media services returned or by specific metadata fields. A user may specify that for a search being performed for a media service (as a movie) that the listing of search results of related media services contains only specific types of media services (movies and television show, for example). Similarly a user may want specific metadata fields to be returned as search results, (as Artist or Guest Performer). The prioritization of search results is controlled similarly as the rankings of metadata fields, as listed above.

In step 435, the user is able to select the related media content and/or information listed in the search results using a user control device. Typically, a user selects a listed URI corresponding to media content by moving the indicator 315 on the listed URI. By enabling a user activated switch, the media center 200 sends a request command (for example, GET HTTP) to the media content's location. The requested media content is then transmitted back as a data signal which when received by media center 200, is rendered at the appropriate media device.

Figure 3C:
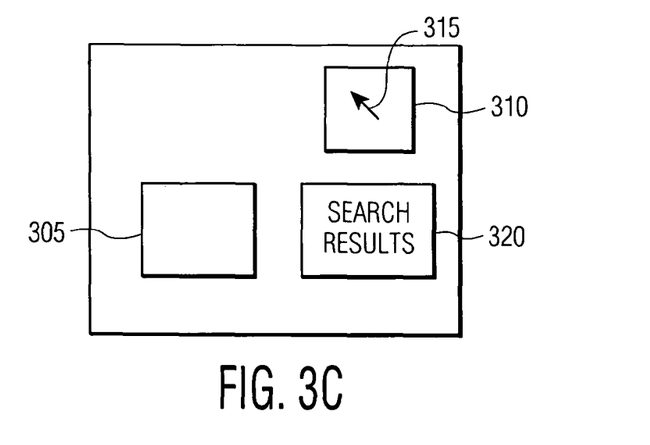
FIG. 3C is a representation of a user interface displaying two rendered media services, and search results returned from a multimedia search, in accordance with an embodiment of the invention.

FIG. 5 is a representation of remote control 500 for use with an exemplary embodiment of the present invention. Remote control 500 transmits control signals, via a radio frequency interface, to set top box 218 (refer to FIG. 2) for controlling media center 200 (FIG. 2). Remote control 500 has several different input means for a user to enter in control commands, for example buttons 512 represent numbers used to make numerical selections, while directional controller 540 accepts directional input, for controlling indicator 315 (refer to FIG. 3A-C), as other types of rendered objects (objects on a web page, for instance). Directional controller 540 may be a joystick, a control pad, trackball, dial and the like. Arrow directional buttons 582, 584, 586, 588 indicate up, down, right, and left respectively. These keys may also be used to control indicator 315 (FIG. 3A-3C).

TV 502, CABLE 504, PVR 506, represents buttons on remote control 500 for enabling and deactivating controlled devices. In the present example, buttons TV 502, CABLE 504, and PVR 506 enable and turn off high definition television 202, set top box 218, and PVR 230 (FIG. 2), respectively.

As a user enters commands via remote control 500; a display device, as high definition television 202, preferably displays characters representing the inputted commands. An on screen display (OSD) as the video processor 730 (FIG. 7) generates the signals that are displayed as characters. Displayed characters may be deleted by activating a delete button 522, on remote control 500, that deletes displayed characters. This deletion step represents the elimination of user input entered in erroneously. Likewise, the entry of inputted data is confirmed by enter button 524.

The search function, as described above, is enabled by search button 550. A user may use connect button 560 to receive media services or information listed in the results listed for a conducted search, identified by URIs. The connect button (that would be used for step 435, above) renders a selected media service in a new rendering environment or replaces the media service in a currently active rendering environment. Select button 570 jumps between URIs listed or identifiers associated with a media content shown in the search results. For example, a user pressing select button 570 goes from a first displayed URI to a second displayed URI. The user may then render the media content identified by a URI by pressing the connect button 560, where the media content, once received as a data signal, is rendered in a new window. Set top box 218 (FIG. 2) is able to accommodate the jumping feature by recognizing the http:// . . . " prefix as the address where a media service is obtained, although other types of resources may be recognized based on their related metadata and identifiers.

Other embodiments consistent with the principles of this invention may be used for a user control device affecting the operation of media center 200, such as sound and video control options, or additional buttons for enabling other devices making up media center 200. Optionally, remote control 500 accommodates alphanumeric input that can be used to operate devices of media center 200.

Although the illustrative embodiments have been described herein with reference to the accompanying drawings, it is to be understood that the present invention is not limited to those precise embodiments, and that various other changes and modifications may be affected therein by one of ordinary skill in the related art without departing from the scope or spirit of the invention. All such changes and modifications are intended to be included within the scope of the invention as defined by the appended claims.

What is claimed is:

1. A method for conducting a search for a related media service of a rendered media service comprising the steps of:
   a. operating an indicator to select a first media service being rendered by a media device, wherein:
   first metadata is associated with said first rendered media service;
   said first rendered media service is a television broadcasted media service; and
   said first rendered media service is being rendered in a first window in a display area, where a border of said first window becomes highlighted when said indicator is used to select said first rendered media service;
   b. detecting activation of a user-operated switch to enable a search function, wherein said switch is on a user control device;
   c. upon detection of activation of said user-operated switch to enable a search function, formatting automatically a query for a search from the first metadata associated with said first rendered media service, wherein said search query is submitted for a search; and wherein said query is formatted without textual input from a user;
   d. preparing for display a search result listing the related media service;
   e. operating said indicator to select a second media service being rendered by said media device, wherein:
   said first and second media services are being rendered in the same display area at the same time;
   second metadata is associated with said second media service;
   said second media service is streaming video; and
   said second media service is being rendered in a second window in said display area, where a border of said second window becomes highlighted when said indicator is used to select said second media service; and
   f. repeating steps b to d for said second media service to determine a second related media service.

2. The method of claim 1, wherein the search result additionally comprises information related to the rendered media service.

3. The method of claim 1, wherein the search result is displayed as a Universal Resource Indicator (URI) that is selectable via a selector to a resource available through a communication network.

4. The method of claim 1, wherein the search engine is accessed through a communications network.

* * * * *